United States Patent
Wada et al.

(10) Patent No.: US 9,517,961 B2
(45) Date of Patent: Dec. 13, 2016

(54) GLASS RIBBON AND METHOD FOR PRODUCING THE SAME

(71) Applicant: Nippon Electric Glass Co., Ltd., Shiga (JP)

(72) Inventors: Masanori Wada, Shiga (JP); Sotohiro Nakajima, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/325,912

(22) Filed: Jul. 8, 2014

(65) Prior Publication Data

US 2014/0318186 A1 Oct. 30, 2014

Related U.S. Application Data

(62) Division of application No. 12/843,163, filed on Jul. 26, 2010, now abandoned.

(30) Foreign Application Priority Data

Jul. 30, 2009 (JP) ................................. 2009-177691

(51) Int. Cl.
C03B 23/037 (2006.01)
C03B 33/037 (2006.01)

(52) U.S. Cl.
CPC ........... C03B 23/037 (2013.01); C03B 33/037 (2013.01); C03B 2225/02 (2013.01); Y10T 428/24488 (2015.01)

(58) Field of Classification Search
CPC ............................. C03B 33/037; C03B 23/037
See application file for complete search history.

(56) References Cited

U.S. PATENT DOCUMENTS

| 3,425,454 | A | * | 2/1969 | Eakins .................. C03B 23/037 138/141 |
| 3,635,687 | A | | 1/1972 | Dunlap et al. |
| 6,060,412 | A | | 5/2000 | Ishida |
| 6,385,998 | B1 | * | 5/2002 | Mizuno .................. C03B 17/04 65/102 |
| 6,482,524 | B1 | | 11/2002 | Yamamoto et al. |
| 7,231,786 | B2 | * | 6/2007 | Cimo .................... C03B 23/037 65/91 |

(Continued)

FOREIGN PATENT DOCUMENTS

| CN | 1128769 | 11/2003 |
| DE | 31 27 721 | 2/1983 |

(Continued)

OTHER PUBLICATIONS

Taiwanese Office Action issued Jun. 15, 2015 in corresponding Taiwanese Patent Application No. 099124528 (with translation).

(Continued)

*Primary Examiner* — Queenie Dehghan
(74) *Attorney, Agent, or Firm* — Wenderoth, Lind & Ponack, L.L.P.

(57) ABSTRACT

A glass ribbon has a thickness of 100 μm or less and includes a convex curved surface portion on a side surface. The glass ribbon can be produced by heating a preform glass material having a thickness of 2 mm or less, and subjecting the preform glass material to drawing so that the preform glass material has a thickness of 100 μm or less.

10 Claims, 7 Drawing Sheets

(56) References Cited

U.S. PATENT DOCUMENTS

| | | |
|---|---|---|
| 2006/0021385 A1 | 2/2006 | Cimo et al. |
| 2007/0178281 A1 | 8/2007 | Nakamura et al. |
| 2008/0041833 A1 | 2/2008 | Cavallaro et al. |
| 2008/0202167 A1 | 8/2008 | Cavallaro et al. |
| 2009/0314032 A1 | 12/2009 | Tomamoto et al. |
| 2011/0177347 A1* | 7/2011 | Tomamoto ............. B65D 57/00 428/426 |

FOREIGN PATENT DOCUMENTS

| | | |
|---|---|---|
| EP | 2 077 254 | 7/2009 |
| EP | 2 277 835 | 1/2011 |
| JP | 5-116974 | 5/1993 |
| JP | 2003-029664 | 1/2003 |
| JP | 2007-197280 | 8/2007 |
| JP | 2008-508179 | 3/2008 |
| JP | 2008-133174 | 6/2008 |
| JP | 2010-132532 | 6/2010 |
| WO | 87/06626 | 11/1987 |
| WO | WO 8706626 A1 * | 11/1987 ........... C03C 17/002 |
| WO | 2006/023132 | 3/2006 |
| WO | 2008/050605 | 5/2008 |

OTHER PUBLICATIONS

Extended European Search Report issued Apr. 9, 2015 in European Application No. 10804301.9.
International Search Report issued Sep. 7, 2010 in International (PCT) Application No. PCT/JP2010/062246.
International Preliminary Report on Patentability and Written Opinion of the International Searching Authority issued Feb. 16, 2012 in International (PCT) Application No. PCT/JP2010/062246.
Chinese Office Action issued Apr. 10, 2014 in corresponding Chinese Patent Application No. 201080022787.1 with English translation.
"China Materials Engineering Canon, vol. 8, Inorganic Non-Metal Materials Engineering, Upper", Dongliang Jiang, etc., Chemistry Industry Press, p. 635, Mar. 31, 2006, cited in Chinese Office Action.
Office Action issued Jul. 28, 2016 in corresponding Korean Application No. 10-2011-7023611, with English translation.

* cited by examiner

GLASS RIBBON AND METHOD FOR PRODUCING THE SAME

BACKGROUND OF THE INVENTION

I. Technical Field

The present invention relates to a glass ribbon used for a glass substrate of flat panel displays, solar cells, or the like, spacers, partition walls, insulators, or the like, and a method of producing the glass ribbon.

II. Description of the Related Art

The potential of the so-called ultrathin sheet glass having a thickness of 200 μm or less has been attracting attention (see JP 2008-133174). The ultra-thinning of glass can impart flexibility to the glass. In recent years, there has been such a tendency that the impartment of flexibility to assorted electronic devices has been desired. For example, organic EL displays have been requested not only to be easily conveyable by folding or winding but also to be usable for curved surfaces as well as for flat surfaces. In addition, if solar cells or organic EL illumination can be formed on the surfaces of substances having curved surfaces such as the body surfaces of automobiles, and the roofs, columns, and external walls of architectures, their applications will expand. Further, the ultrathin sheet glass has been expected to find applications in spacers as well, and hence a more thin glass for a spacer has been expected in order to form a more thin space. In addition to the foregoing, the ultrathin sheet glass has been expected to find use in, for example, plasma displays, capacitors, and the partition walls of fuel cells and the like. Accordingly, the ultrathin sheet glass has been expected to find use in assorted applications.

As an attempt besides thinning, an improvement in accuracy of side surfaces has been proposed in order to impart flexibility to thin sheet glass (see JP 2007-197280 A). JP 2007-197280 A below describes a thin sheet glass whose side surface has a surface roughness of 0.2 μm or less. The thin sheet glass described in the document hardly fractures even when a force is applied in a torsional direction, and therefore has a high reliability for a more flexibility.

SUMMARY OF THE INVENTION

However, the thin sheet glass described in JP 2007-197280 A has a rectangular shape in cross section as shown in FIG. 7. Such the thin sheet glass of rectangular shape in cross section involves a problem, wherein a stress concentration occurs at edge portions of four corners in cross section during bending with a large curvature (such as winding with a bobbin having a small diameter), so that the thin sheet glass results in fracture. In addition, in the thin sheet glass of rectangular shape in cross section, defects such as chips or cracks are apt to be generated at the edge portions of the four corners in cross section during handling and so on, which makes the problem of fracture as above more remarkable.

The present invention has been made to solve such problem in the prior arts as described above. That is, an object of the present invention is to provide a glass ribbon capable of being bent at a large curvature (such as winding with a bobbin having a small diameter) while avoiding a stress concentration on a side surface.

A glass ribbon of the present invention is characterized by having a thickness of 100 μm or less and a convex curved surface portion on a side surface.

In the glass ribbon according to the present invention, a part of the side surface may be constituted of the convex curved surface portions. However, it is preferred that the side surface is constituted of the convex curved surface portion entirely.

In the glass ribbon of the present invention, it is preferred that the convex curved surface portion is of a fire-polished surface.

In the glass ribbon of the present invention, it is preferred that thickness unevenness is 20% or less of the thickness.

In the glass ribbon of the present invention, it is preferred that an aspect ratio of a width to the thickness is 25 to 2000.

In the glass ribbon of the present invention, it is preferred that a glass material thereof is a crystallized glass.

The glass ribbon of the present invention can be brought into the form of a glass roll by being wound around, for example, a bobbin having a flange. In this case, the glass ribbon is preferably wound in a state of being superimposed on a packaging buffer sheet.

The glass ribbon of the present invention can be produced by heating a perform glass material having a thickness of 2 mm or less and drawing the preform glass material in order to be its thickness of 100 μm or less. In this case, the preform glass material preferably has a viscosity of $10^{6.0}$ to $10^{9.0}$ dPa·s during the drawing. In addition, the drawing can be performed by winding the glass ribbon around a drum.

According to the present invention, the glass ribbon has the convex curved surface portion on a side surface, so that a stress concentration on edge portions of four corners in cross section can be prevented when the glass ribbon is bent. In addition, the generation of chips or cracks at the corners can be suppressed. Therefore, a glass ribbon capable of being bent at a large curvature (such as winding with a bobbin having a small diameter) can be obtained. In the present invention, for forming the convex curved surface portion on the side surface of the glass ribbon, such a method is suitable that comprises the steps of heating the preform glass material and subjecting the preform glass material to a drawing into a ribbon shape. Desired convex curved surface portion can be formed by appropriately adjusting, for example, the size and a material for the preform glass material, a temperature condition during the drawing, and a tension speed.

Constituting the side surface of the convex curved surface portion entirely, a stress concentration on the side surface at the time when the glass ribbon is bent can be prevented in a more sureness. Thereby the glass ribbon can be bent at a more large curvature (such as winding with a bobbin having a small diameter).

Making the convex curved surface portion on the side surface a fire-polished surface, the surface of the convex curved surface portion is free from chips, cracks, and the like, and therefore the glass ribbon can be prevented from fractures originated from the side surface. As a result, the glass ribbon can be bent at a more large curvature (such as winding with a bobbin having a small diameter).

When the thickness unevenness of the glass ribbon is set to be 20% or less of the thickness, the glass ribbon can be wound with a more large curvature, and can be fairly wound without any misalignment.

When an aspect ratio of the width to the thickness of the glass ribbon is set to 25 to 2000, the glass ribbon can become an ultrathin glass ribbon.

When the glass material for the glass ribbon is a crystallized glass, the glass ribbon can be provided with a more high heat resistance, mechanical strength, and dielectric characteristic.

When the glass ribbon is wound around a bobbin having a flange so as to be brought into the form of a glass roll, the storage, transportation, handling, and the like of the glass ribbon can be facilitated. In this case, synergistically with the presence of the curved surface portion on the side surface of the glass ribbon, the glass ribbon is wounded around the bobbin smoothly while the curved surface portion on the side surface of the glass ribbon is guided along the flange portion of the bobbin. In addition, smooth unwinding and rewinding can be achieved when the glass ribbon is unwinded from the bobbin.

Further, when the glass ribbon is wound in a state of being superimposed on a packaging buffer sheet, the surface accuracy of the surface can be prevented from deteriorating owing to rubbing each other.

When the glass ribbon is produced by the steps of heating the preform glass material having a thickness of 2 mm or less and drawing the preform glass material in order to be its thickness of 100 μm or less, the convex curved surface portion can be obtained without special processing such as grinding or polishing on the side surface of the glass ribbon. In addition, the surfaces of the glass ribbon become fire-polished surfaces after the drawing, which enable to efficiently produce a glass ribbon having a high surface quality that cannot be obtained by ordinary polishing methods. Therefore, a glass ribbon having a convex curved surface portion on a side surface, which has a high surface quality while being unprocessed, can be obtained.

When the viscosity of the preform glass material during the drawing is set to $10^{6.0}$ to $10^{9.0}$ dPa·s, a flat glass ribbon, which is free from warping in the width direction of the glass ribbon, bending at both ends, thickness unevenness, and the like, and thereby has a uniform thickness, can be obtained.

In addition, when the drawing is performed by winding the glass ribbon around a drum, the drawing can be performed without the use of tension rollers having such a constitution in that front and rear surfaces in the thickness direction of the glass ribbon are sandwiched with a pair of rollers, or in that a tension is applied to the glass ribbon by passing the glass ribbon through a plurality of rollers arranged in an S-shape (zigzag) fashion. In addition, due to nonuse of these rollers, it can be effectively prevented from such disadvantages in that, during the drawing, the glass ribbon may be crushed to be fractured by the tension rollers, or in that the surface accuracy of the glass ribbon may deteriorate due to contact with the tension rollers. As a result, the glass ribbon can be produced with an improved accuracy.

DETAILED DESCRIPTION OF THE INVENTION

Figure 1A:
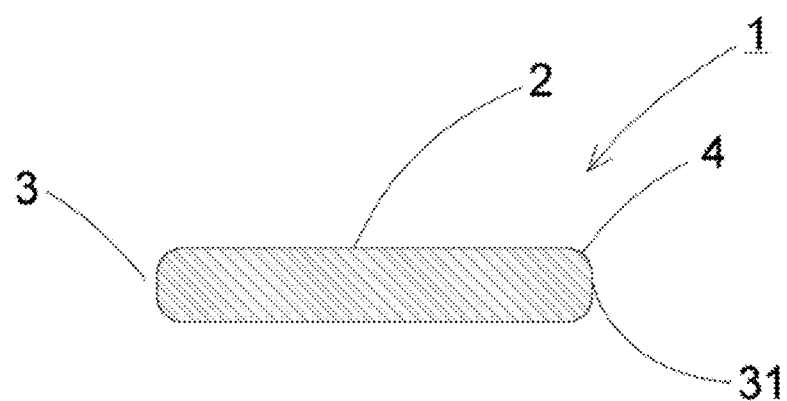
FIG. 1a is a cross-sectional view of a glass ribbon according to the present invention.

Hereinafter, preferred embodiments of glass ribbon according to the present invention are described with reference to drawings.

As shown in FIG. 1, a glass ribbon (1) according to the present invention includes a flat surface (2) and a side surface (3), and is characterized in that the glass ribbon has convex curved surface portions (4) on the side surface (3).

A silicate glass is mainly used as a material for the glass ribbon (1), however, any material can be used as long as the material is a glass that can be subjected to a drawing, such as a soda glass, a borosilicate glass, an aluminum silicate glass, or a silica glass.

Alternatively, a crystallized glass that can be subjected to a drawing can be used as a material for the glass ribbon (1). The crystallized glass is excellent in heat resistance. Accordingly, when the crystallized glass is used as a material for the glass ribbon (1), the glass ribbon can be suitably used as a part requiring a high operating temperature such as a partition wall of a solid oxide fuel cell or the like, or a dielectric substance.

The thickness of the glass ribbon (1) according to the present invention is 100 μm or less, preferably 50 μm or less, more preferably 25 μm or less, still more preferably 20 μm or less, or most preferably 10 μm or less in order that flexibility may be imparted to the glass ribbon (1). In addition, the thickness of the glass ribbon (1) is preferably 0.5 μm or more, more preferably 1 μm or more, or most preferably 5 μm or more in order that the strength of the glass ribbon (1) may be maintained.

The thickness unevenness of the glass ribbon (1) is preferably as small as possible in order that, when the glass ribbon (1) is bent, a tensile stress may be prevented from locally concentrating on the surface (2) on the outer peripheral side and be uniformly applied. To be specific, the thickness unevenness is preferably 20% or less, or more preferably 10% or less of the thickness. It should be noted that the thickness unevenness is a value obtained by measuring the thicknesses at five points arranged at an equal interval in the width direction on a portion having the surface (2), and then dividing a difference between the maximum value and the minimum value by the average value of the measured values.

In order that, when the glass ribbon (1) is bent, a tensile stress is prevented from locally concentrating on the surface (2) on the outer peripheral side, and is uniformly applied, the surface (2) is preferably as flat as possible. To be specific, the flat surface (2) is preferable to have a high surface quality in which a surface roughness Ra of 0.5 nm or less, more preferably 0.3 nm or less, or most preferably 0.2 nm or less.

The glass ribbon (1) preferably has an aspect ratio of its width to its thickness of 25 to 2000. In this case, the glass ribbon can be a glass ribbon of an ultrathin sheet. When the aspect ratio is 25 or less, such the glass deviates from an application as a ribbon, and is used as a rod or fiber. When the aspect ratio is 2000 or more, such the glass is used as a glass film.

As shown in FIG. 1, the side surface (3) is provided with the convex curved surface portions (4). In this case, when the glass ribbon (1) is bent, stress concentration on edge portions at four corners in cross-section can be prevented. In addition, the generation of chips or cracks can be prevented. Therefore, the glass ribbon (1) capable of being bent at a large curvature (such as winding with a bobbin having a small diameter) can be obtained.

The convex curved surface portions (4) are preferably fire-polished surfaces. Since the glass ribbon is not subjected to a chamfering process such as a grinding or polishing after forming, the surfaces of the convex curved surface portions (4) are free from breakings, chips, cracks, and the like, so that a fracture of the glass ribbon (1) from the side surface can be effectively prevented. Therefore, the glass ribbon (1) capable of being bent at a more large curvature (such as winding with a bobbin having a small diameter) can be obtained.

Figure 2:
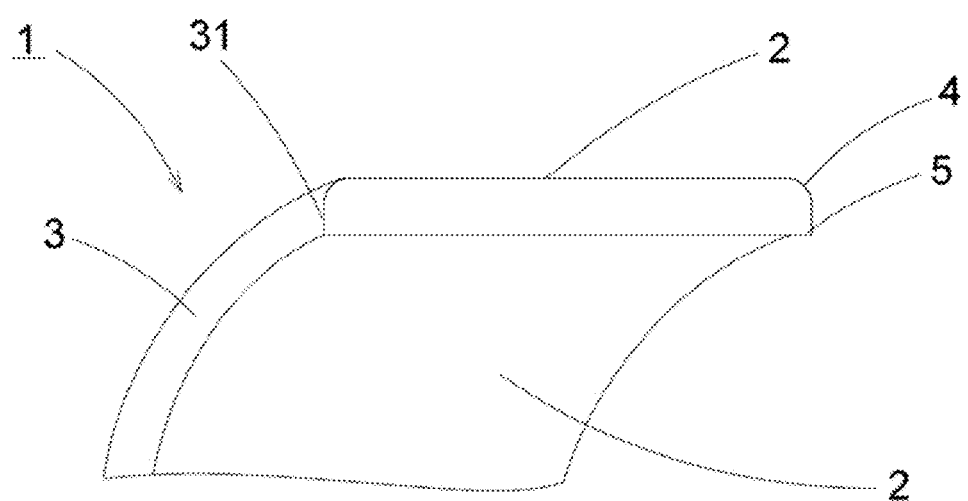
FIG. 2 is a cross-sectional view when the glass ribbon according to the present invention is bent.

In order to prevent concentration of a tensile stress on the edge portions at the four corners in cross-section when the glass ribbon (1) is bent, the convex curved surface portions (4) may be formed on at least two corners positioned on the outer peripheral side when bending the glass ribbon (1), among the four corners of the glass ribbon (1) having a substantially rectangular shape in cross-section as shown in FIG. 2. On the other hand, since no tensile stress is applied to the two corners positioned on the inner peripheral side, the two corners on the inner peripheral side are no need to form the convex curved surface portions (4) and may have edge portions (5). However, as shown in FIG. 1(a), the convex curved surface portions (4) are preferably formed on all the four corners of the glass ribbon (1) of a substantially rectangular shape in cross-section in order that the front surface and rear surface of the glass ribbon (1) may be usable without any distinction.

Figure 1B:
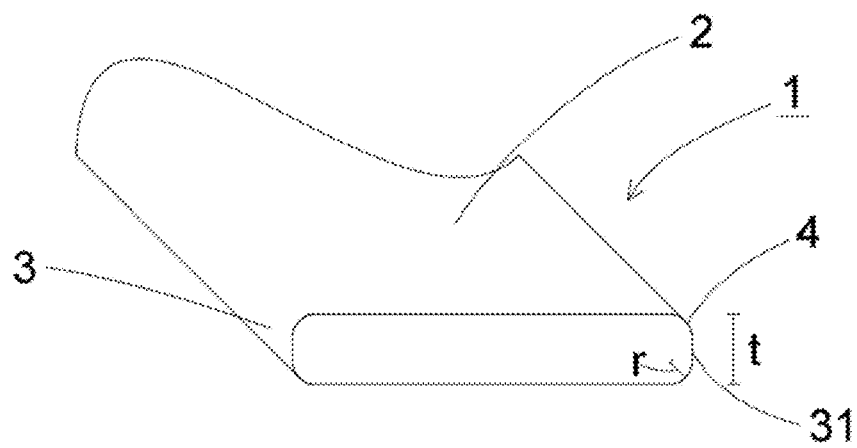
FIG. 1b is a partial diagrammatic perspective view of the glass ribbon according to the present invention.

In FIGS. 1 and 2, the convex curved surface portions (4) of the glass ribbon (1) are each of a true circular arc shape in cross-section, however, without limiting this shape, the portions (4) may be sector shape or elliptical arc shape. In order to make a tensile stress apply on the convex curved surface portions (4) evenly when bending the glass ribbon (1), each of the convex curved surface portions (4) is preferably to have a true circular arc shape. When the convex curved surface portions (4) are each of a true circular arc shape in cross-section as shown in FIG. 1(b), a radius r of the true circle is preferably equal to or smaller than one half of a thickness t of the glass ribbon (1). In this case, since the curvature of each of the convex curved surface portions (4) can be increased, a tensile stress applied to the convex curved surface portions (4) can be more widely dispersed. In addition, the radius r is preferably equal to or larger than one fiftieth of the thickness t of the glass ribbon (1). When the radius r is smaller than one fiftieth of the thickness t of the glass ribbon (1), the curvature of each of the convex curved surface portions (4) is so small that a stress concentration may occur to cause fracture of the glass ribbon (1) when bending the glass ribbon (1) at a large curvature. In addition, the generation of chips or cracks at the convex curved surface portions (4) may be apt to occur.

It is preferred that, in cross-section of the glass ribbon (1), between the convex curved surface portions (4) and the flat surface (2), and between the convex curved surface portions (4) and a flat surface portion (31) of the side surface (3) are smoothly connected to each other. To be specific, in a curved surface from the flat surface to the side surface, a curvature gradually increases from the flat surface, takes a local maximum value, and then gradually reduces toward the side surface to smoothly connect to the side surface. When the curvature takes the local maximum value, the curvature has preferably a radius r equal to or smaller than one half of the thickness t of the glass ribbon (1). In this case, concentration of a tensile stress at edge portions is prevented, and hence the glass ribbon (1) can be bent at a more large curvature. In addition, when the curvature takes the local maximum value, the curvature has preferably a radius r equal to or larger than one fiftieth of the thickness t of the glass ribbon (1). When the radius r is smaller than one fiftieth of the thickness t of the glass ribbon (1), the curvature of each of the convex curved surface portions (4) is so small that stress concentration may occur to cause fracture of the glass ribbon (1) when bending the glass ribbon at a large curvature. In addition, the generation of chips or cracks at the convex curved surface portions (4) may be apt to occur. If the portions between the convex curved surface portions (4) and the flat surface (2), and between the convex curved surface portions (4) and the flat surface portion (31) of the side surface (3) are formed to have edged portions, a tensile stress may concentrate on that edge portions when bending the glass ribbon (1).

Figure 3A:
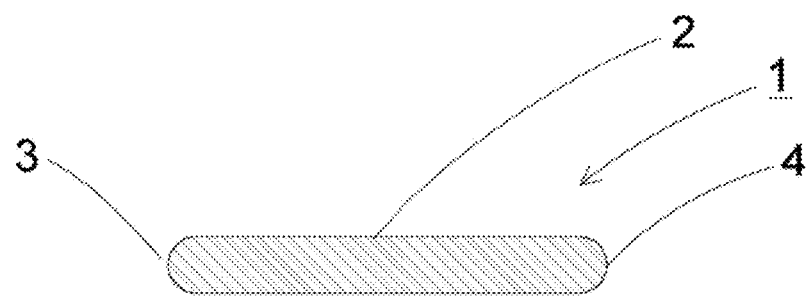
FIG. 3a is a cross-sectional view of a glass ribbon according to an embodiment in which a side surface is entirely constituted of convex curved surface portion.
Figure 3B:
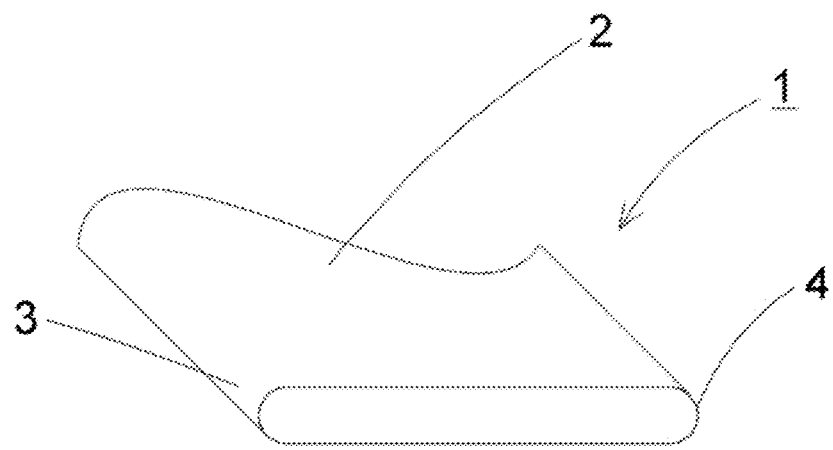
FIG. 3b is a diagrammatic partial perspective view of the glass ribbon according to the embodiment in which the side surface is entirely constituted of the convex curved surface portions.

As shown in FIG. 3, the side surface (3) is preferably formed of the convex curved surface portions (4) entirely. In the case where the side surface (3) is provided with the flat surface portion (31) in cross-section as shown in FIG. 1, a tensile stress may concentrate on the flat surface portion (31) when bending the glass ribbon (1). However, in the case where the side surface (3) is not provided with the flat surface portion (31) and is constituted only of the convex curved surface portion (4), a stress is prevented from concentrating on the side surface (flat surface portion) more surely, so that the stress can be dispersed, when bending the glass film (1). Thereby, the glass ribbon can be bent at a more large curvature (such as winding with a bobbin having a small diameter).

The convex curved surface portions (4) are each preferably of an elliptical shape whose major axis is parallel to the flat surface (2), or most preferably of a true circular shape. In a similar way to the above, it is preferred that the flat surface (2) and the convex curved surface portions (4) are smoothly connected to each other. To be specific, in a curved surface from the front surface to the rear surface, a curvature gradually increases from the front surface, takes a local maximum value, and then gradually reduces toward the rear surface to smoothly connect to the rear surface. When the curvature takes the local maximum value, the curvature has preferably a radius r equal to or smaller than one half of the thickness t of the glass ribbon (1). In addition, when the curvature takes the local maximum value, the curvature has preferably a radius r equal to or larger than one fiftieth of the thickness t of the glass ribbon (1).

Figure 4A:
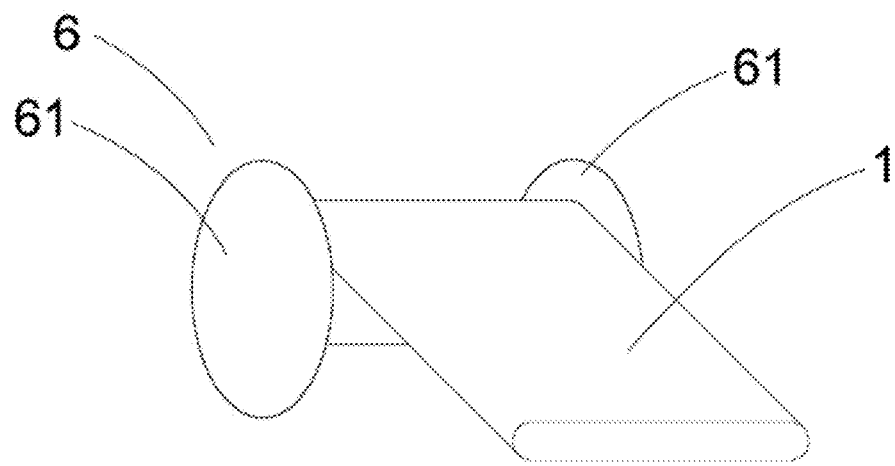
FIG. 4a is a diagrammatic perspective view of a state where the glass ribbon according to the present invention is wound around a bobbin.

As shown in FIG. 4(a), the glass ribbon (1) according to the present invention is preferably wound around a bobbin (6) having flanges (61) at both ends. In this case, even when the glass ribbon (1) is directly mounted, the glass ribbon (1) does not directly contact a mounting surface, and hence the storage, transportation, handling, and the like of the glass ribbon (1) can be facilitated.

Figure 4B:
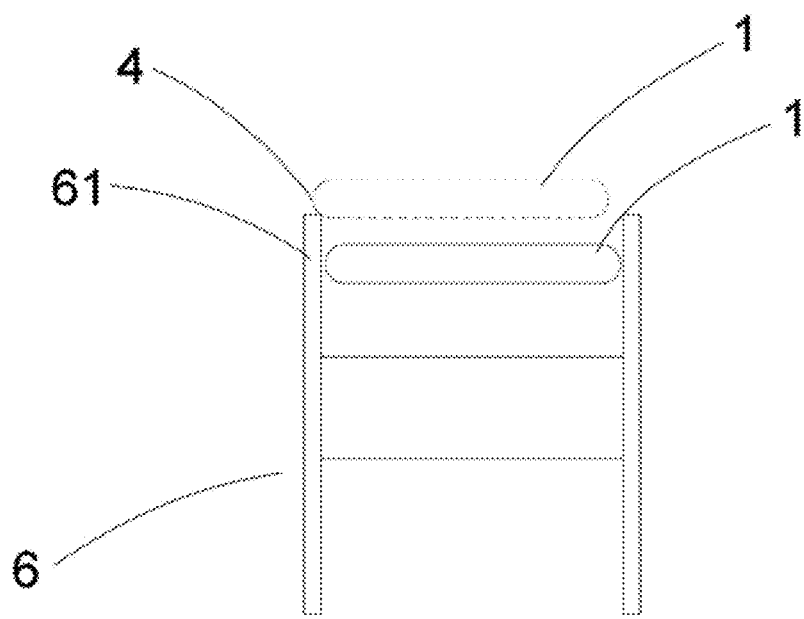
FIG. 4b is a front view of the state where the glass ribbon according to the present invention is wound around the bobbin.

The glass ribbon (1) according to the present invention has the convex curved surface portions (4) on the side surface (3). Accordingly, as shown in FIG. 4(b), when winding the glass ribbon (1) around the bobbin (6), the side ends of the glass ribbon (1) contact with the flanges (61) of the bobbin (6) (in the state of the glass ribbon as shown by the broken line in of FIG. 4(b)), and then the convex curved surface portions (4) being on the side surface (3) of the glass ribbon (1) are guided along the flanges (61), so that the glass ribbon (1) is wound around the bobbin (6). As a result, winding around the bobbin (6) is facilitated. In addition, winding and rewinding of the glass ribbon (1) around the bobbin (6) can be smoothly performed because the convex curved surface portions (4) are guided along the flanges (61).

The glass ribbon (1) according to the present invention is preferably wound in the state of being superimposed on a packaging buffer sheet. In this case, the surface accuracy of the surface can be prevented from deteriorating due to rubbing between portions of the glass ribbon. A foamed resin sheet, a resin film, an insertion paper, a nonwoven fabric, or the like can be used as the packaging buffer sheet. The packaging buffer sheet is preferably wider than the glass ribbon (1) for protecting the side surface (3) of the glass ribbon (1). In addition, it is preferred that the width dimension of the packaging buffer sheet is substantially equal to that between the flanges (61) of the bobbin (6). In this case, the packaging buffer sheet can be prevented from becoming misaligned between the flanges (61) of the bobbin (6). As a result, the surface accuracy of the flat surface (2) and side surface (3) of the glass ribbon (1) can be prevented from deteriorating more surely.

Figure 5:
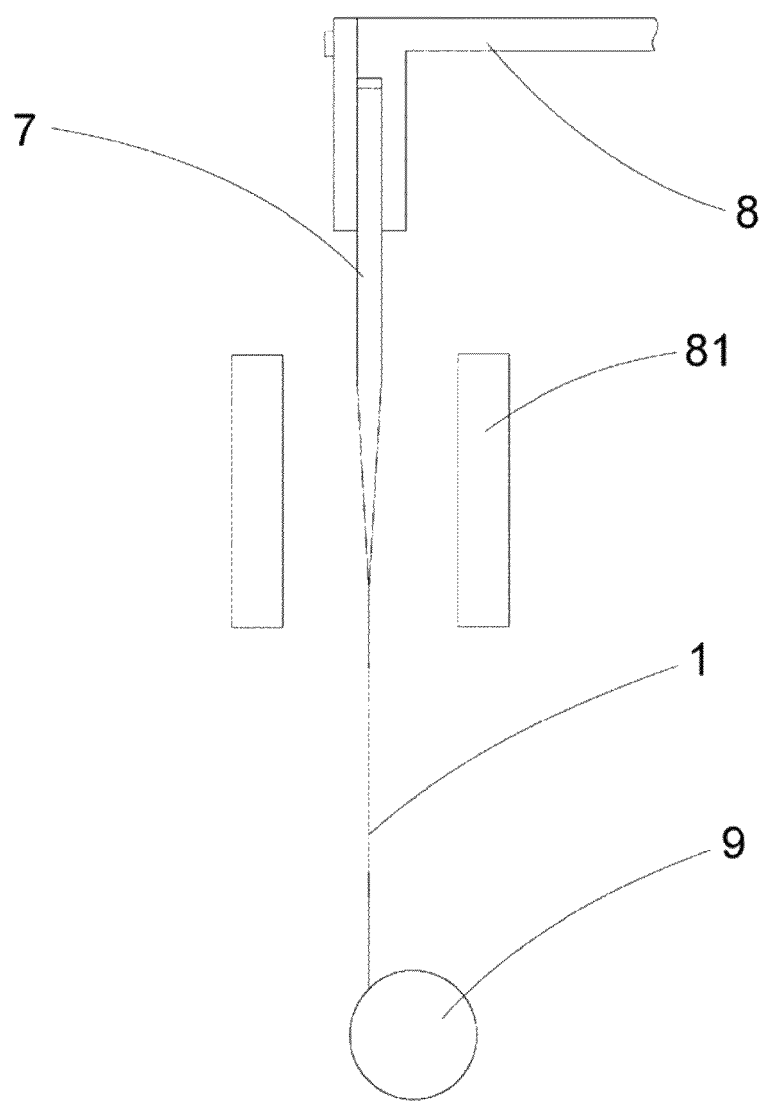
FIG. 5 is a schematic view of a production apparatus for the glass ribbon according to the present invention.

FIG. 5 is a schematic view when the glass ribbon (1) is viewed from the side of the side surface (3). The glass ribbon (1) according to the present invention can be produced by the following production method.

A preform glass material (7) formed of a borosilicate glass adjusted to have a thickness of 2 mm or less is prepared. The preform glass material (7) is obtained by forming a molten glass supplied from a glass melting furnace (not illustrated) into a substantially rectangular shape having predetermined dimensions with applying a known forming method such as a roll forming method, a float forming method, an up-draw forming method, or a slot down-draw forming method. The preform glass material (7) is particularly preferably formed by an overflow down-draw method. This is because no flaws are generated on the surface of the preform glass material (7), so that the preform glass material (7) having a high surface quality can be obtained. When the surface quality of the preform glass material (7) is high, the surface quality of the glass ribbon (1) after drawing to be described later can also be improved, and hence the glass ribbon (1) capable of being wound at a more large curvature can be produced.

Although the side surfaces of the preform glass material (7) may be unprocessed, the following adjustment may be suitably performed. That is, four corners on the side surfaces are subjected to, for example, the so-called C chamfering or R chamfering so that the convex curved surface portions (4) formed on the side surfaces (3) of the glass ribbon (1) after the drawing to be described later may each have a desired shape.

Next, the preform glass material (7) is set in a drawing apparatus (8) as shown in FIG. 5, and then drawn so as to have a thickness of 100 μm or less. As a result, the glass ribbon (1) having the convex curved surface portions (4) of fire-polished surfaces on the side surfaces (3) is obtained.

A glass ribbon having the convex curved surface portions (4) on the side surfaces can be produced by employing a thin sheet glass having a thickness of 2 mm or less as the preform glass material (7) and drawing the preform glass material (7) in order to be the thickness of 100 μm or less. When the thickness of the preform glass material exceeds 2 mm or the thickness of the glass ribbon (1) exceeds 100 μm, an edge portion or thickened edge portion may be formed on the glass ribbon (1). The preform glass material (7) has a thickness of preferably 0.5 mm or less, or more preferably 0.1 mm or less. In addition, the preform glass material (7) preferably has an aspect ratio of its width to its thickness of 25 to 2000.

The drawing is preferably performed at such a temperature that the viscosity of the preform glass material (7) is $10^{6.0}$ to $10^{9.0}$ dPa·s. In this case, a flat glass ribbon which is free from warping in the width direction of the glass ribbon, bending at both ends, thickness unevenness, and the like, and has a uniform thickness can be obtained. On the other hand, in the case where the drawing is performed at such a temperature that the viscosity of the preform glass material (7) is lower than $10^{6.0}$ dPa·s (a higher temperature), the aspect ratio may largely change, which is not preferred. In addition, in the temperature at which the viscosity of the preform glass material (7) exceeds $10^{9.0}$ dPa·s (a lower temperature), it becomes difficult to perform the drawing due to too high viscosity, which is not preferred. The drawing is more preferably performed at such a temperature that the viscosity of the preform glass material (7) is $10^{6.0}$ to $10^{7.5}$ dPa·s in order to produce a glass ribbon having the convex curved surface portions (4) on the side surfaces. In particular, in the case where the thickness of the preform glass material (7) is 0.5 mm or less, the thickness of the glass ribbon (1) after the drawing is 25 μm or less, and the drawing is performed so that the viscosity may be $10^{6.0}$ to $10^{7.0}$ dPa·s, the side surfaces become the convex curved surface portions of fire-polished surfaces and the side surface (3) is free from the flat surface portion (31), which is most preferred. Meanwhile, the drawing is more preferably performed at such a temperature that the viscosity of the preform glass material (7) is $10^{7.5}$ to $10^{9.0}$ dPa·s in order to avoid a change in aspect ratio, though the convex curved surface portions of the side surfaces tend to be small. In particular, substantially no change in aspect ratio occurs when the drawing is performed at such a temperature that the viscosity is $10^{8.0}$ to $10^{9.0}$ dPa·s.

The drawing is performed with using a winding drum (9). In conventional drawing, a tension is applied by sandwiching a glass with a pair of rollers. However, if a tension is attempted to apply by sandwiching the glass ribbon (1) according to the present invention with a pair of rollers, the glass ribbon (1) is so thin that the glass ribbon (1) fractures due to a pressure from the pair of rollers. It is also conceivable that a tension is applied by pulling the glass ribbon (1) in a zigzag fashion (S-shape fashion) with tension rollers zigzag arranged. However, both surfaces of the glass ribbon (1) contact with the rollers, and hence surface quality may deteriorate. Thus, in the production method of the present invention, a tension for drawing is applied by directly winding the glass ribbon (1) after drawing with the winding drum (9). The adjustment of the tension (adjustment of a drawing speed) is performed depending on the winding speed of the winding drum (9). In this case, the glass ribbon (1) having high surface quality can be obtained. Although the winding drum (9) having flanges is used in FIG. 5, a winding drum with no flanges may be also used.

The glass ribbon (1) wound with the winding drum (9) is cut every predetermined length (every predetermined weight). After the winding drum (9) has been exchanged, the winding of the glass ribbon (1) is restarted. Although the glass ribbon (1) wound with the winding drum (9) may be packaged and shipped as it is, the glass ribbon (1) may be shipped in small quantities by performing rewinding around the bobbin (6). Alternatively, direct winding around the bobbin (6) may be performed instead of the use of the winding drum (9).

Figure 6:
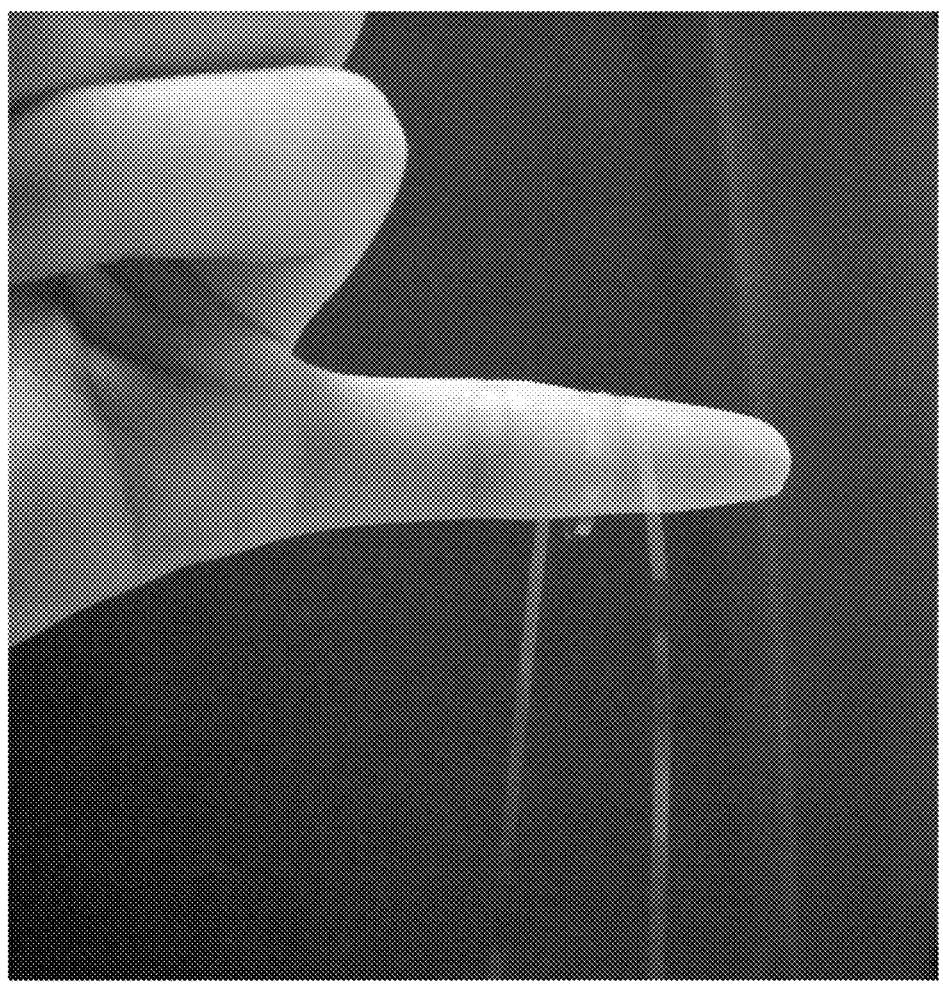
FIG. 6 is a view illustrating a state where the glass ribbon according to the present invention is wound around a finger.
Figure 7:
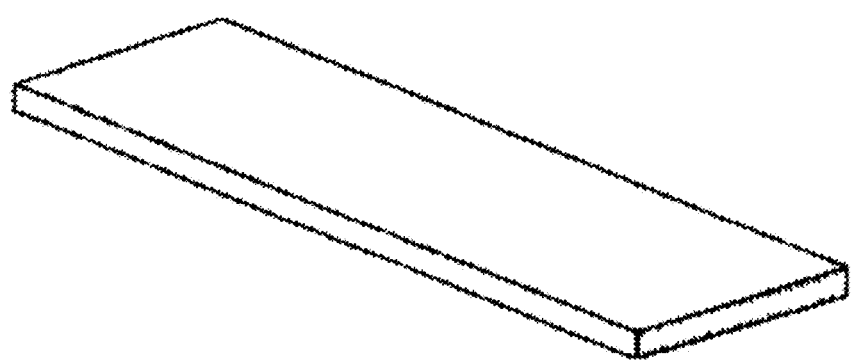
FIG. 7 is a view of a conventional thin sheet glass.

As shown in FIG. 6, the glass ribbon (1) according to the present invention obtained by the above-mentioned production method does not fracture even when wound around a human finger, and can be wound at a large curvature (such as a bobbin having a small diameter).

EXAMPLES

Hereinafter, the glass ribbon of the present invention is described in detail on the basis of examples. However, the present invention is not limited to these examples.

Example 1

A formed article (having a width of 50 mm and a thickness of 0.3 mm) of a BDA manufactured by Nippon Electric Glass Company, Limited (having a softening point of 740° C.) was prepared as a preform glass material.

The preform glass material was set in a drawing apparatus. The preform glass material was supplied at a speed of 6 mm/min from a supply port of a forming furnace kept at a temperature of 785° C. (corresponding to a viscosity of the preform glass material of $10^{6.7}$ dPa·s), and was drawn from a drawing port at 1350 mm/min by being wound around a winding drum. Thus, a glass ribbon having a width of 3.0 mm and a thickness of 22 µm (having an aspect ratio of 135) was obtained.

The thicknesses of a total of five points arranged at an equal interval in the width direction (both ends, positions at distances of 0.75 mm each from the right end and the left end, and the center (position at a distance of 1.5 mm from each of both the ends)) of the glass ribbon (having a width of 3.0 mm) were measured with a thickness-measuring apparatus (NEXIV manufactured by Nikon Corporation). The measured thicknesses ranged from 21.5 µm to 22.0 µm, and thickness unevenness was 0.5 µm (corresponding to about 2% of the average thickness).

The glass ribbon was cut in its width direction, and the cut surface was observed with a microscope. As a result, its side surface was constituted of a convex curved surface.

When the glass ribbon was wound around a glass rod having a diameter of 4 mm, the glass ribbon did not fracture.

Example 2

A formed article (having a width of 50 mm and a thickness of 0.3 mm) of a BDA manufactured by Nippon Electric Glass Company, Limited (having a softening point of 740° C.) was prepared as a preform glass material.

The preform glass material was set in a drawing apparatus. The preform glass was supplied at a speed of 4 mm/min from a supply port of a forming furnace kept at a temperature of 785° C. (corresponding to a viscosity of the preform glass material of $10^{6.7}$ dPa·s), and was drawn from a drawing port at 900 mm/min by being wound around a winding drum. Thus, a glass ribbon having a width of 3.3 mm and a thickness of 20 µm (having an aspect ratio of 167) was obtained.

The glass ribbon was cut in its width direction, and the cut surface was observed with a microscope. As a result, its side surface was constituted of a convex curved surface.

When the glass ribbon was wound around a glass rod having a diameter of 4 mm, the glass ribbon was not ruptured.

The thicknesses of the glass ribbon (having a width of 3.3 mm) were measured in the same method as in Example 1. The measured thicknesses ranged from 20.2 µm to 21.0 µm, and thickness unevenness was 0.8 µm (corresponding to about 4% of the average thickness). In order to compensate for such a change that the aspect ratio is reduced, corrections for the temperature distribution in the furnace and the drawing speed were carried out, thereby such an effect that the glass ribbon was extended in a lateral direction in the process of the drawing was given. As a result, the central portion became thin.

Example 3

A formed article (having a width of 50 mm and a thickness of 0.3 mm) of a BDA manufactured by Nippon Electric Glass Company, Limited (having a softening point of 740° C.) was prepared as a preform glass material. After that, the preform glass material was subjected to drawing under the same temperature condition as that of Example 2. Thus, a glass ribbon having a width of 1 mm and a thickness of 6 µm was obtained.

When the glass ribbon was wound around a glass rod having a diameter of 1 mm, the glass ribbon was not ruptured.

Example 4

A formed article (having a width of 100 mm and a thickness of 1.5 mm) of a BDA manufactured by Nippon Electric Glass Company, Limited (having a softening point of 740° C.) was prepared as a preform glass material. After that, the preform glass material was subjected to drawing under the same temperature condition as that of Example 2. Thus, a glass ribbon having a width of 2 mm and a thickness of 30 µm was obtained.

When the glass ribbon was wound around a glass rod having a diameter of 8 mm, the glass ribbon was not ruptured.

Example 5

A formed article (having a width of 50 mm and a thickness of 0.2 mm) of a BDA manufactured by Nippon Electric Glass Company, Limited (having a softening point of 740° C.) was prepared as a preform glass material.

The preform glass material was set in a drawing apparatus. The preform glass material was supplied at a speed of 8 mm/min from a supply port of a forming furnace kept at a temperature of 725° C. (corresponding to a viscosity of the preform glass material of $10^{8.0}$ dPa·s), and was drawn from a drawing port at 800 mm/min by being wound around a winding drum. Thus, a glass ribbon having a width of 5.0 mm and a thickness of 20 µm (having an aspect ratio of 250) was obtained.

The thicknesses of the glass ribbon (having a width of 5.0 mm) were measured in the same method as in Example 1. The measured thicknesses ranged from 19.7 µm to 20.1 µm, and thickness unevenness was 0.4 µm (corresponding to about 2% of the average thickness). Since the viscosity during drawing was set to $10^{8.0}$ dPa·s, a change in aspect ratio was small. In addition, correction for extending is not needed, and hence the thickness unevenness is small.

The glass ribbon was cut in its width direction, and the cut surface was observed with a microscope. As a result, the radius of curvature of the convex curved surface portion was 2 μm or less (corresponding to 10% or less of the average thickness) at the position where the curvature became a local maximum.

When the glass ribbon was wound around a glass rod having a diameter of 4 mm, the glass ribbon was not ruptured.

Example 6

A formed article (having a width of 50 mm and a thickness of 0.5 mm) of a crystallized glass KS-108 that can be subjected to drawing, manufactured by Nippon Electric Glass Company, Limited (having a softening point of 1140° C.) was prepared as a preform glass material.

The preform glass material was set in a drawing apparatus. The preform glass material was supplied at a speed of 4 mm/min from a supply port of a forming furnace kept at a temperature of 1175° C. (corresponding to a viscosity of the preform glass material of $10^{7.5}$ dPa·s), and was drawn from a drawing port at 2500 mm/min by being wound around a winding drum. Thus, a glass ribbon made of crystallized glass having a width of 2.0 mm and a thickness of 20 μm (having an aspect ratio of 100) was obtained.

The present invention can be suitably used in glass substrates, spacers, partition walls, dielectric substances, and the like.

The invention claimed is:

1. A method of producing a glass ribbon, comprising the steps of:
   preparing a glass preform having a thickness of 2 mm or less;
   heating the glass preform; and
   drawing the heated glass preform to form a glass ribbon, while winding the glass ribbon directly on a bobbin or winding drum without contacting any tension rollers, wherein a predetermined tension is applied to the glass ribbon during the drawing by adjusting a winding speed of the bobbin or winding drum so that the glass ribbon comprises side surfaces, and wherein the bobbin or winding drum has flanges at both ends thereof, and a distance between the flanges in an axial direction of the bobbin or winding drum is compatible with a width of the glass ribbon to guide the side surfaces of the glass ribbon.

2. The method of producing a glass ribbon according to claim 1, wherein, in the step of heating, the glass preform has a viscosity of $10^{6.0}$ to $10^{9.0}$ dPa·s.

3. The method of producing a glass ribbon according to claim 1, wherein in the step of drawing, fire-polished convex curved surfaces are formed on the side surfaces of the glass ribbon.

4. The method of producing a glass ribbon according to claim 1, wherein in the step of drawing, the side surfaces of the glass ribbon are formed entirely into fire-polished convex curved surfaces.

5. The method of producing a glass ribbon according to claim 1, wherein the glass ribbon has a thickness of 100 μm or less and a thickness unevenness of 20% or less.

6. The method of producing a glass ribbon according to claim 1, further comprising superimposing the glass ribbon on a packaging buffer sheet.

7. The method of producing a glass ribbon according to claim 6, wherein the packaging buffer sheet has a width greater than the width of the glass ribbon and substantially equal to the distance between the flanges.

8. A method of producing a glass ribbon, comprising the steps of:
   preparing a glass preform having a thickness of 2 mm or less;
   heating the glass preform; and
   subjecting the glass preform to a down-drawing to form a glass ribbon while winding the glass ribbon directly on a bobbin or winding drum without contacting any tension rollers, wherein a predetermined tension is applied to the glass ribbon during the down-drawing by adjusting a winding speed of the bobbin or winding drum so that the glass ribbon has a thickness of 100 μm or less and comprises side surfaces, wherein the side surfaces are entirely fire-polished convex curved surfaces, and wherein the bobbin or winding drum has flanges at both ends thereof, and a distance between the flanges in an axial direction of the bobbin or winding drum is compatible with a width of the glass ribbon to guide the side surfaces of the glass ribbon.

9. The method of producing a glass ribbon according to claim 8, further comprising superimposing the glass ribbon on a packaging buffer sheet.

10. The method of producing a glass ribbon according to claim 9, wherein the packaging buffer sheet has a width greater than the width of the glass ribbon and substantially equal to the distance between the flanges.

* * * * *